United States Patent
Geier et al.

(10) Patent No.: US 6,348,994 B1
(45) Date of Patent: Feb. 19, 2002

(54) METHOD FOR GENERATING A STEREOSCOPIC IMAGE OF AN OBJECT AND AN ARRANGEMENT FOR STEREOSCOPIC VIEWING

(75) Inventors: Karl-Heinz Geier; Hans Tandler, both of Jena; Gudrun Nordt, Cospeda, all of (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 09/505,724

(22) Filed: Feb. 17, 2000

Related U.S. Application Data

(63) Continuation of application No. 08/881,278, filed on Jun. 24, 1997, now abandoned, which is a continuation-in-part of application No. 08/610,455, filed on Mar. 4, 1996, now Pat. No. 5,835,246.

(30) Foreign Application Priority Data

| Mar. 2, 1995 | (DE) | 195 07 344 |
| Nov. 17, 1995 | (DE) | 195 42 827 |
| Feb. 22, 1996 | (DE) | 196 06 424 |
| Jun. 24, 1996 | (DE) | 196 25 200 |
| May 30, 1997 | (DE) | 197 22 726 |

(51) Int. Cl.$^7$ .................. G02B 27/26; G02B 27/22; G02B 21/22
(52) U.S. Cl. ............... 359/465; 359/462; 359/376; 359/377; 359/378; 359/464
(58) Field of Search ................. 359/376, 377, 359/378, 462, 464, 465, 375; 348/54, 55, 56, 57, 58; 600/111

(56) References Cited

U.S. PATENT DOCUMENTS

| 4,561,731 A | 12/1985 | Kley |
| 4,682,029 A | 7/1987 | Diepeveen et al. ......... 250/330 |
| 4,806,776 A | 2/1989 | Kley |
| 5,285,196 A | 2/1994 | Gale, Jr. |
| 5,382,961 A | 1/1995 | Gale, Jr. |
| 5,444,566 A | 8/1995 | Gale, Jr. |
| 5,588,948 A | 12/1996 | Takahashi et al. |
| 5,748,367 A | 5/1998 | Lücke et al. ................ 359/375 |

FOREIGN PATENT DOCUMENTS

| DE | 0577231 | 5/1933 |
| DE | DD290278 | 5/1991 |

(List continued on next page.)

OTHER PUBLICATIONS

"Moderne der Lichtmikroskopie" by G. Göke, Kosmos Verlag, Stuttgart, 1998, pp. 312 to 314.
"ABC der Optik", by K. Mütze, Verlag Werner Dausien, Hanau/Main, 1972, pp. 142 to 143.
"Novel beam–splitting microscope tube for taking stereo–pairs with full resolution Nomarski or phase contrast technique, or with epifluoroescence" by R. Wolf, Journal of Microscopy, vol. 153, Feb. 1989, p. 181 to 186.

*Primary Examiner*—Audrey Chang
(74) *Attorney, Agent, or Firm*—Walter Ottesen

(57) ABSTRACT

An arrangement for generating a stereoscopic image of an object for viewing by an observer includes an imaging optic for imaging the object and defining an imaging beam path as well as an entry pupil and an exit pupil. Illuminating optics illuminate the object by providing an imaging beam coming from the object and passing through the imaging optic and along the imaging beam path. The imaging beam is sectioned in the imaging beam path into two component beams at one of the following locations: in the exit pupil, near the exit pupil or at a position along the imaging beam path which is optically conjugated to the exit pupil, thereby forming stereoscopic sectioned images. The stereoscopic section images are allocated in a clocked manner to the left and the right eyes of the observer.

10 Claims, 7 Drawing Sheets

FOREIGN PATENT DOCUMENTS

| | | |
|---|---|---|
| DE | 4236803 | 5/1994 |
| DE | 4243556 | 6/1994 |
| DE | 4311603 | 10/1994 |
| EP | 0656554 | 6/1995 |
| EP | 0664470 | 7/1995 |
| EP | 0730181 | 9/1996 |
| GB | 2268283 | 1/1994 |
| JP | 4-355712 | 12/1992 |
| WO | WO92/18894 | 10/1992 |
| WO | WO94/02872 | 2/1994 |
| WO | WO95/14952 | 6/1995 |
| WO | WO95/16218 | 6/1995 |

METHOD FOR GENERATING A STEREOSCOPIC IMAGE OF AN OBJECT AND AN ARRANGEMENT FOR STEREOSCOPIC VIEWING

RELATED APPLICATION

This is a continuation of application Ser. No. 08/881,278, filed Jun. 24, 1997, now abandonment which, in turn, is a continuation-in-part application of U.S. patent application Ser. No. 08/610,455, filed Mar. 4, 1996, now U.S. Pat. No. 5,835,246.

BACKGROUND OF THE INVENTION

The known stereoscopic arrangements are based on two separate microscopic beam paths for respective eyes of the viewer. The conventional arrangements are the Greenough type and the Galilei type. Both types have the disadvantage which is the limitation of microscopic resolution so that apertures greater than 0.1 are possible only with substantial complexity. This comes about because large working distances are desired in stereo arrangements and since, for conventional arrangements, only limited aperture space is present because of the following: the required angle for the stereo viewing, the two separate beam paths and the frame parts of the two beam paths with manipulable dimensioning.

It is further known to insert half diaphragms in the form of polarization filters in the condenser of a single-objective microscope in order to obtain a stereoscopic effect. The polarization directions of the polarization filters are mutually perpendicular and correspondingly orientated polarization filters must be provided in the two tubes. In this connection, reference can be made to the "Journal of Microscopy", volume 153, February 1989, pages 181 to 186.

Published German patent application 4,311,603 discloses a stereomicroscope having a high magnification wherein an object translator is provided in the beam path on the object side of a single-objective light microscope in the object plane. A beam switchover device is mounted in the beam path on the image side. Disadvantageous is here the object translator because the movement of the translator can lead to vibrations of the entire microscope, especially for objects having a large mass.

U.S. Pat. Nos. 4,561,731 and 4,806,776 disclose that a pseudo stereoscopic effect can be generated with the aid of a so-called differential polarization illumination. For the illumination, two separate light sources are provided and polarizers are mounted downstream thereof for generating different polarization directions.

U.S. Pat. No. 4,561,731 shows in FIG. 10 thereof and in the description corresponding thereto that a proper stereoscopic image can be generated in that polarizers are mounted in the light path of the oculars and a double refracting plate is mounted between objective and object. The single illuminating beam path is alternately polarized differently.

A similar arrangement is described in PCT patent publication WO 94/02872. Here too, two light sources and two beam paths are utilized.

This also applies to a surgical microscope disclosed in published German patent application DD-A5 290,278. Two illuminating systems lying diametrically opposite to each other are inclined to the optical axis and the image viewed in the right ocular is assigned to the first illuminating system and the image viewed with the left ocular is assigned to the second illuminating system.

A method for generating stereoscopic images of an object is described in U.S. Pat. No. 5,835,264 incorporated herein by reference. This method includes the steps of illuminating an object with an illuminating beam; masking the illuminating beam to generate a first component beam to illuminate the object at a first angle and provide a first image of the object to a first viewing eye; again masking the illuminating beam to generate a second component beam to illuminate the object at a second angle and to provide a second image of the object to a second viewing eye; and, alternately repeating the last two steps at a frequency above the flicker frequency of the human eye.

The arrangement for carrying out the above method includes a beam generating device for alternately generating first and second illuminating beam components which illuminate the object via illuminating optics at respectively different angles to produce respective images of the object. A directing device alternately directs the images to the left and right eyes of a viewer at a frequency above the flicker frequency of the human eye.

SUMMARY OF THE INVENTION

In view of the above, it is an object of the invention to supplement the embodiments described in the above-identified application with further advantageous embodiments and to optimally configure the entire microscopic arrangement with respect to resolution and depth of field as well as with respect to stereo impression.

The stereoscopic image of a self-luminous object such as a microscopic fluorescent object is especially advantageously generated in that the exit pupil of the objective is sectioned and is alternately supplied in a clocked manner to the left and right eyes at a frequency above the flicker frequency. It is advantageous to section the exit pupil into two lunes having respective centroids which are so adjustable that viewing of the object at a variable stereo angle takes place while, simultaneously, the viewing aperture remains utilized to a maximum. In this way, a high microscopic resolution is achieved. In this method, transilluminated objects and incident-light illuminated objects can be viewed. Pupil sectioning takes place in one embodiment via a DMD mirror close to the exit pupil (DMD=Digital Micromirror Devices). Digital micromirror devices comprise a plurality of micromirrors having angle positions which can be electrostatically adjusted.

In a second embodiment, the pupil sectioning takes place in or close to the exit pupil via a light modulator such as a liquid crystal matrix. The image viewing takes places utilizing clocked image-recording and image-reproducing equipment, such as a video camera and monitor, or via clocked light modulators in the ocular beam path. The ocular beam paths can, however, also be clocked via a polarizing beam splitter having a switchable LCD cell.

In a third embodiment, the pupil sectioning takes place near the exit pupil via a high-resolution video camera. The image viewing takes place after a Fourier transformation of the two pupil images and clockwise reproduction for each eye via a monitor shutter or shutter spectacles.

It is further advantageous to mount diaphragms in or near the entry pupil of the microscope objective as well as in or near its exit pupil. The diaphragms are preferably adjustable and/or exchangeable.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
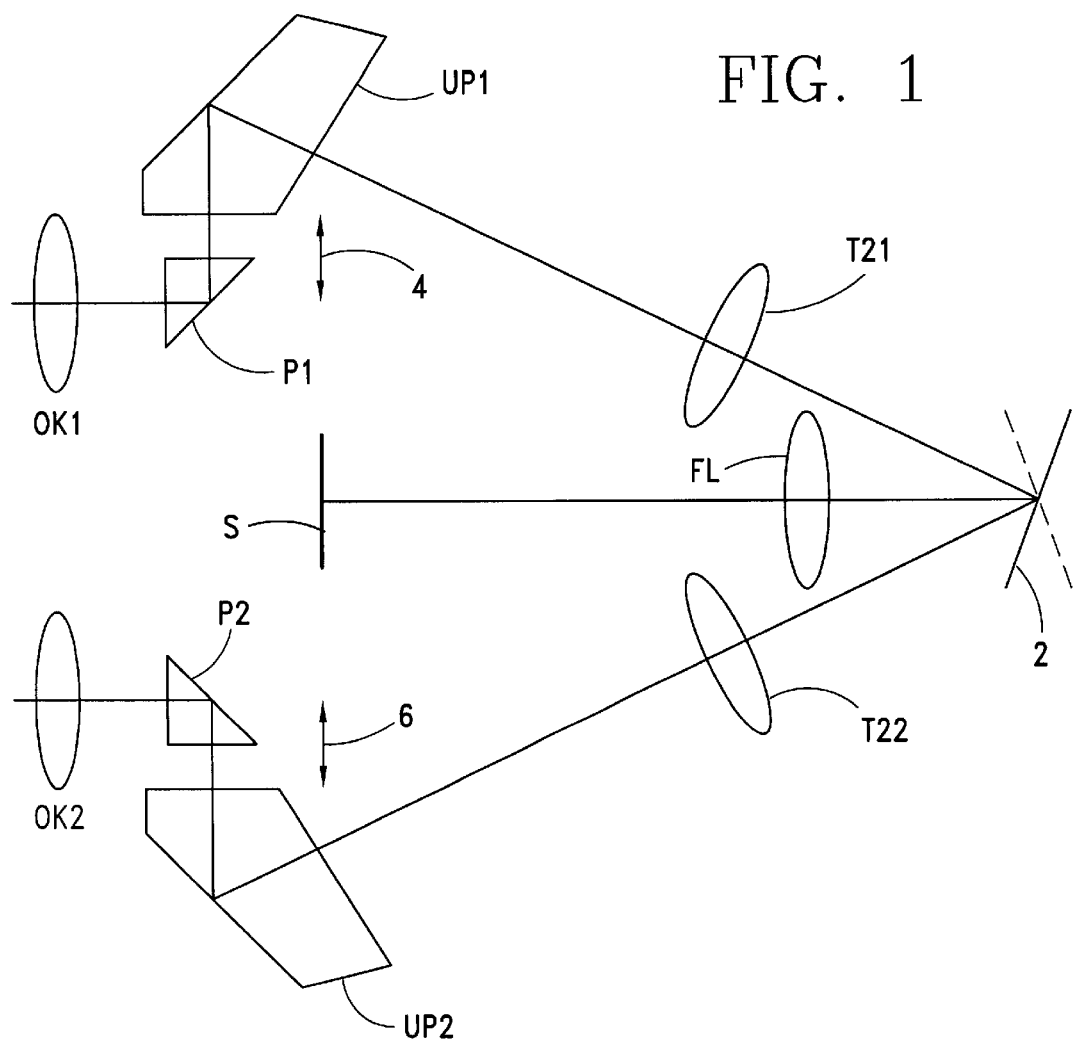
FIG. 1 is a schematic plan view of an arrangement for sectioning pupils utilizing a DMD mirror.
Figure 2:
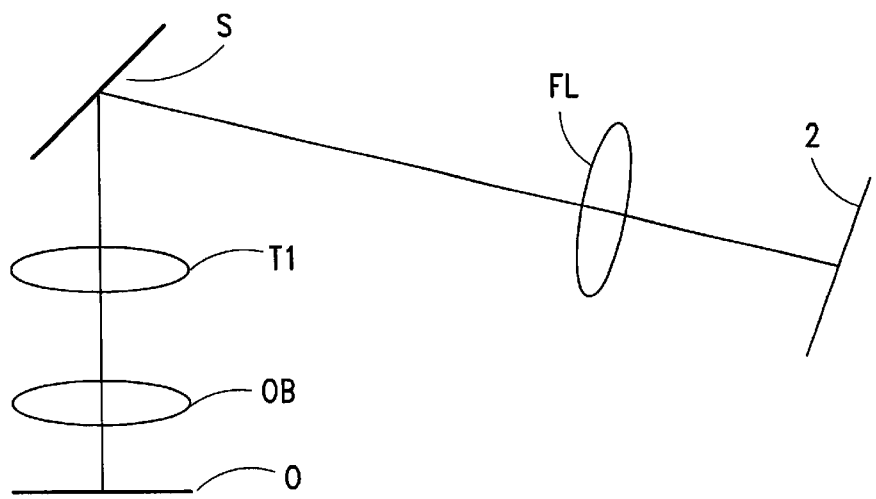
FIG. 2 is a side elevation view of the arrangement of FIG. 1.

In FIGS. 1 and 2, the light of a self-luminous object O is received by objective OB. A tube lens T1 generates a first intermediate image on the far side of mirror S. A field lens FL generates an image of the exit pupil of the objective OB on a DMD mirror 2. The DMD mirror 2 sections the imaging beam into two component beams in a clocked manner for left and right oculars (OK1, OK2) so that the centroid of each component beam makes stereo viewing possible and the aperture is maximally utilized. The tube lenses (T21, T22) generate the intermediate image for the particular ocular. Deflection prisms (UP1, UP2) and prisms (P1, P2) guide the intermediate image of the ocular viewing. The spacing between the eyes of the viewer is adjustable by shifting the prisms (P1, P2) as indicated by double arrows 4 and 6.

Figure 3:
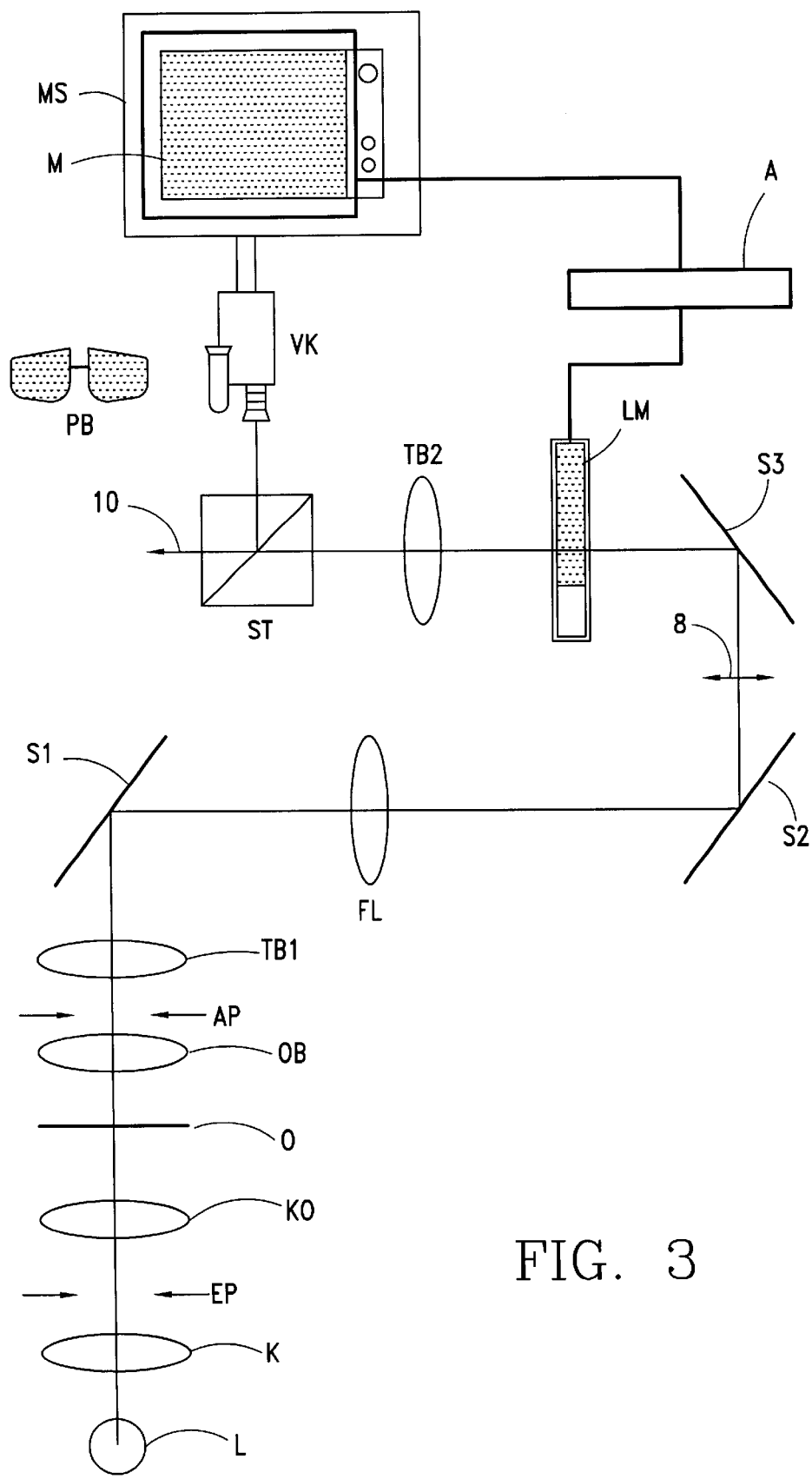
FIG. 3 is a schematic representation of another embodiment of the arrangement according to the invention wherein pupil sectioning is performed utilizing a LCD modulator.

In FIG. 3, an illuminator L illuminates the object O via a collector K and a condenser KO. The object O modulates the light or is excited to self-illumination (for example, fluorescence). Condenser KO and objective OB image the entry pupil EP into the exit pupil AP. The field lens FL generates, via mirrors (S1, S2, S3), an image of the exit pupil AP in the plane of the light modulator LM which, for example, can be configured as a LCD modulator. The mirrors S2 and S3 can be advantageously coupled and displaced as a unit as indicated by double arrow 8 in FIG. 3 in order to precisely image the exit pupils of different objectives OB in the modulator plane LM.

The tube lenses (TB1, TB2) ensure the imaging of the intermediate images of the object O in a video camera VK and, via beam splitter ST, to the binocular tube for the ocular viewing as indicated by arrow 10.

The LCD modulator LM sections the imaging beam into two component beams in a clocked manner so that the centroid of each component beam makes stereo viewing possible and the aperture is maximally utilized.

Sectioning of the exit pupil is possible which goes beyond simple sectional images, for example, by providing mutually overlapping lunes. A video camera VK assumes the particular image in a clocked manner. A drive controls the light modulator LM and the video camera VK so that in each case, one of the two images of a stereoscopic image pair is recorded. The display of the three-dimensional image takes place preferably via an electronic image screen. The viewer wears polarizing spectacles PB and views a monitor M via a monitor shutter MS which defines a switchable polarizing filter. The monitor shutter MS is mounted forward of the monitor M and is driven by drive A via line 12. The monitor shutter MS switches the polarization direction by 90° at a clock frequency pregiven by drive A. The monitor shutter MS and its position relative to the monitor are described, for example, in a publication entitled "User Manual", publication No. 063-2071-00, published by NuVision Technologies, Beaverton, Oreg.

Figure 8:
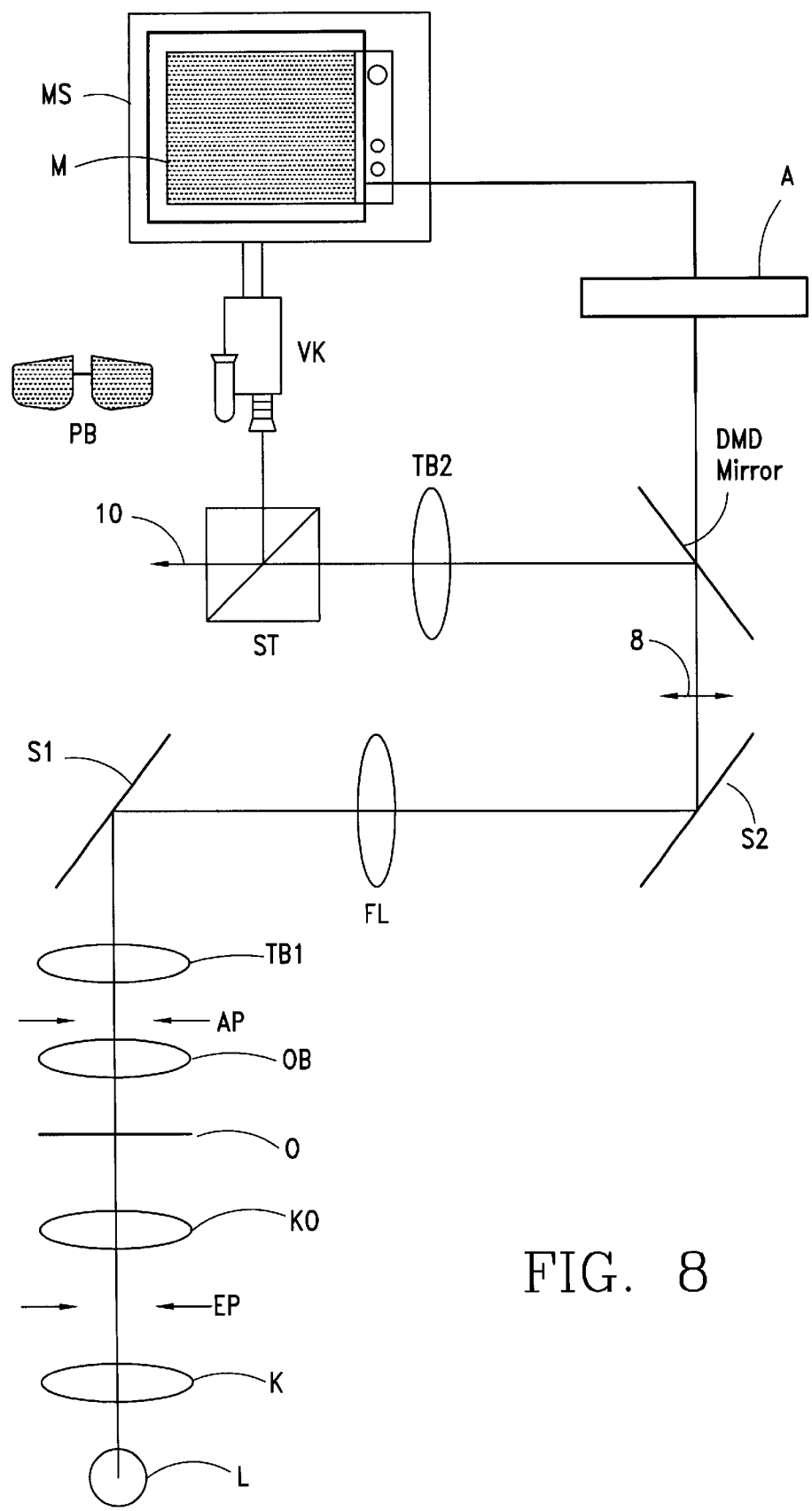

FIG. 8 is a schematic corresponding to the arrangement shown in FIG. 3 except that a DMD mirror is utilized for pupil sectioning in lieu of the LCD modulator.

Figure 4:
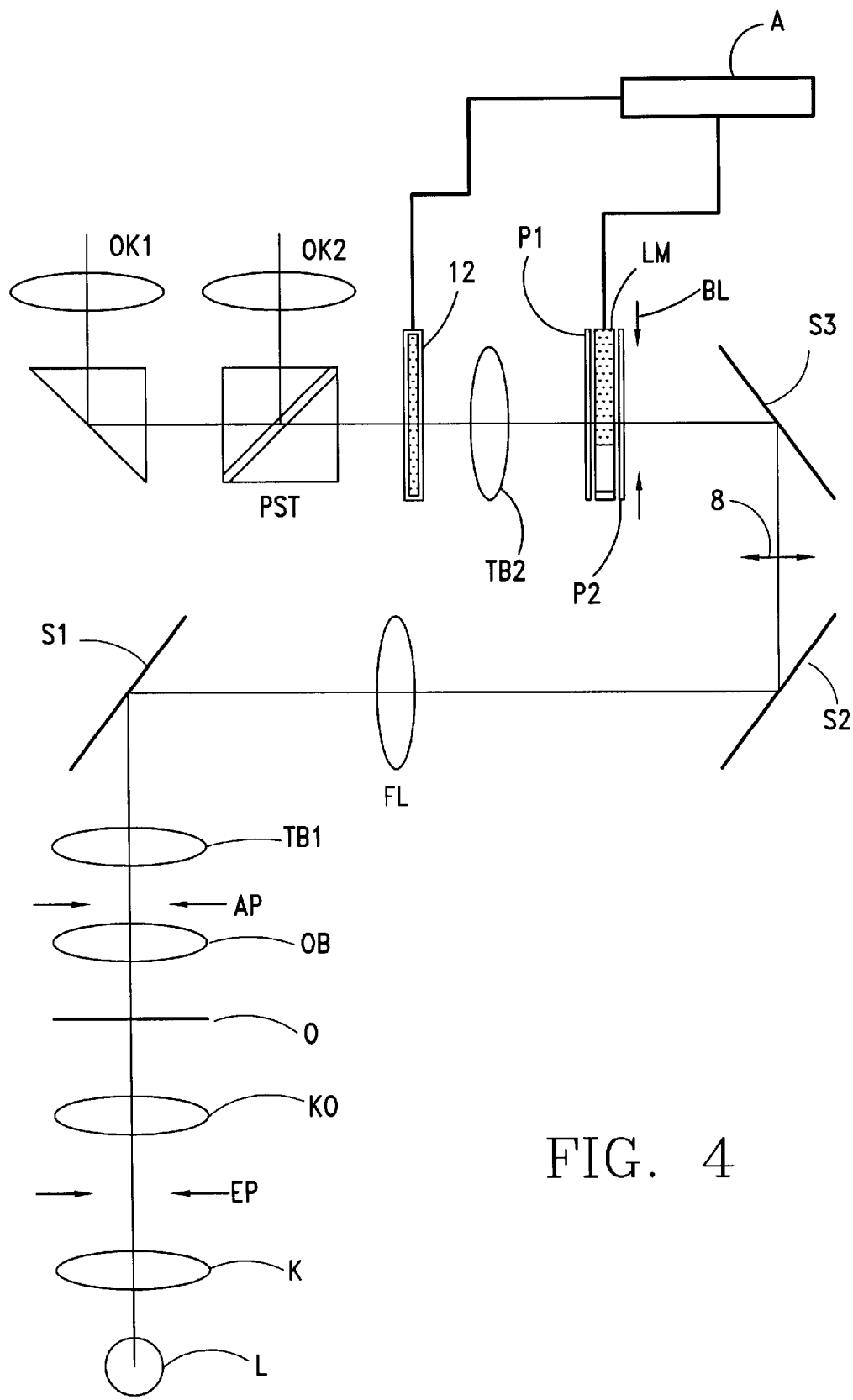
FIG. 4 is a schematic of another embodiment of the arrangement according to the invention wherein pupil sectioning is performed utilizing a LCD modulator and beam splitting via a switchable polarizing beam splitter.

The polarizing filter is triggered by the drive A with the change of the stereoscopic sectional images. Direct stereoscopic viewing via oculars (OK1, OK2) is also possible with a combination of a polarizing beam splitter PST and a LCD modulator as shown in FIG. 4. The mirrors S2 and S3 are coupled and displaceable in the direction of double arrow 8 as in FIG. 3.

If ferroelectric liquid crystal elements are used as a LCD modulator LM between two polarizing filters (P1, P2), then the second polarizing filter P2, as seen in light beam direction, can operate as a polarizing filter for a LCD cell which is connected to the drive A. This LCD cell rotates the polarizing direction of the incident light beam by 90° but does not change the polarizing direction and this is done in accordance with the applied electrical voltage.

The following polarizing beam splitter PST has a polarizing splitter layer, that is, the layer reflects light of a specific polarizing direction and light of the polarizing direction oscillating perpendicularly thereto passes through the splitter layer. The drive of the LCD modulator LM is so coupled to the drive of the LCD cell 12, that each eye, in combination with the polarizing beam splitter, receives the image allocated thereto. For a correct allocation, an upright stereo image is formed. For all arrangements, it is advantageous to mount a variable iris diaphragm BL in or close to the exit pupil AP or to optically conjugate the iris diaphragm to the exit pupil AP. By varying the diameter of the iris diaphragm BL, the contrast, the resolution, the depth of field and the three-dimensional impression can be varied. This is shown in FIG. 4.

Figure 5:
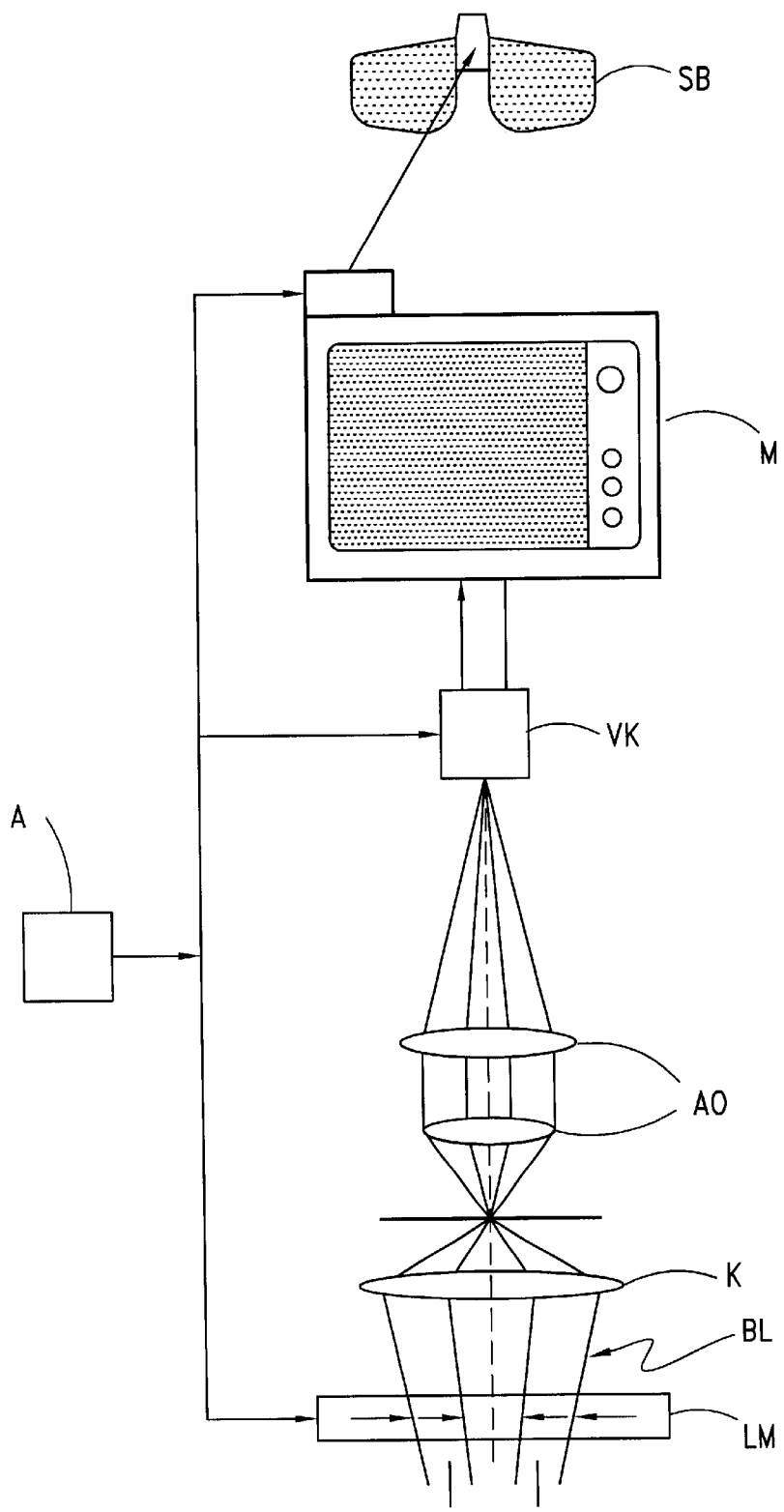
FIG. 5 is a transilluminating light arrangement wherein a monitor and shutter spectacles are used for viewing.

FIG. 5 shows a transilluminating light arrangement wherein viewing takes place via a monitor M and shutter spectacles SB. This transilluminating light arrangement is shown and explained in detail in U.S. Pat. No. 5,835,264, and incorporated herein by reference.

Figure 6:
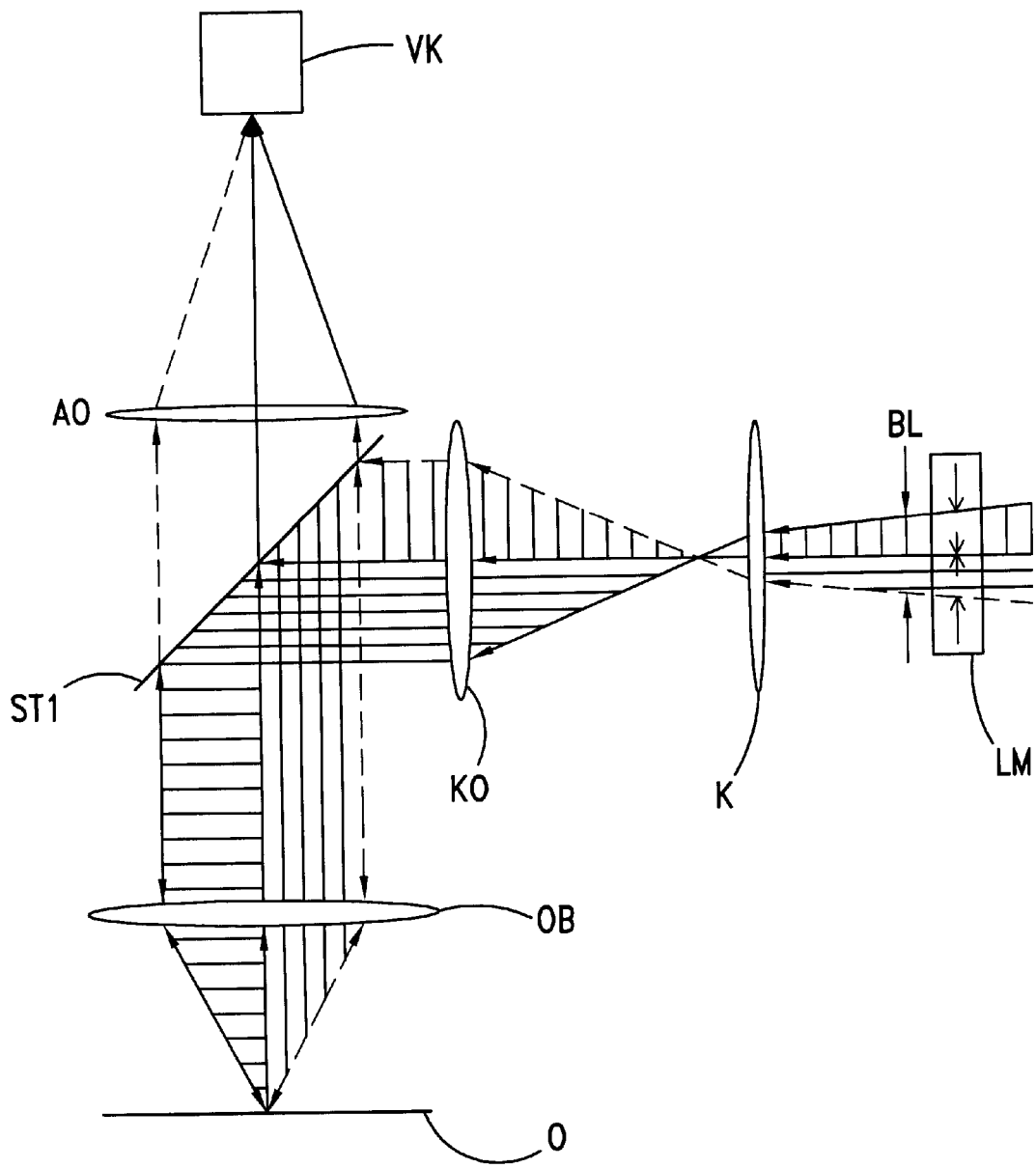
FIG. 6 is an incident light arrangement wherein illumination is via a beam splitter.

In FIG. 6, an incident light arrangement having illumination via a beam splitter ST1 is shown. In this arrangement, a light modulator LM is mounted in the aperture diaphragm plane of the illuminating beam path and an adjustable diaphragm BL is mounted in the vicinity of the light modulator LM.

The image of the object is imaged via an imaging optic AO into a video camera VK. Imaging of the object via objectives switchable over the entire area likewise makes possible a stereoscopic viewing. The diaphragm BL is preferably of circular shape and is mounted near the entry pupil of the objective.

The depth of field and the resolution of the stereoscopic image can be adapted to the object by varying the inner diameter of the circular diaphragm BL, for example, by means of an iris diaphragm. In this way, an excellent stereoscopic image is viewed.

Figure 7B:
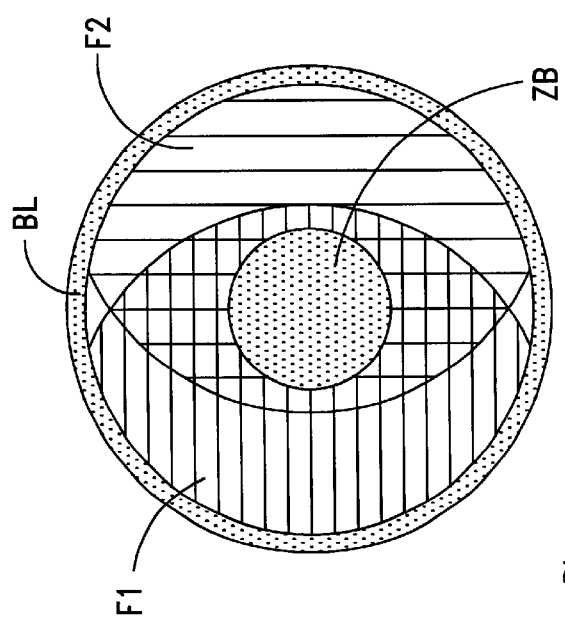
FIG. 7b shows the light relationships in the plane of the aperture diaphragm wherein a variable central diaphragm is mounted as an opaque circular diaphragm.
Figure 7C:
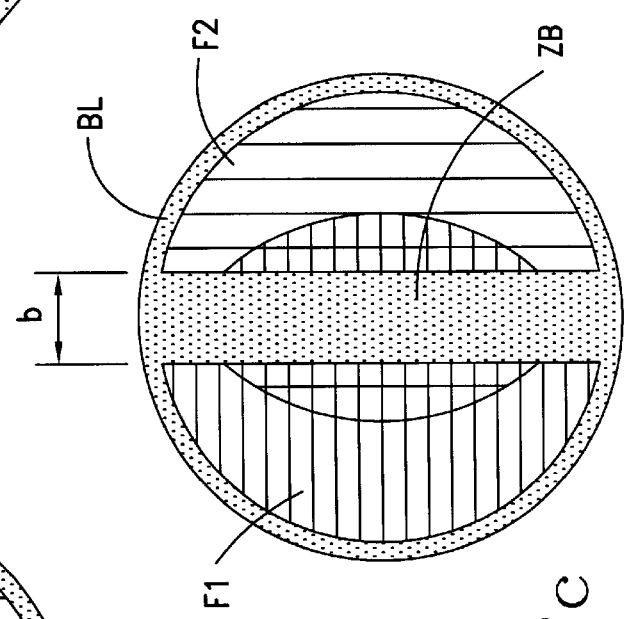
FIG. 7c shows the light relationships in the plane of the aperture diaphragm wherein a variable central diaphragm is mounted as an opaque rectangular diaphragm; and, FIG. 8 is a schematic representation of the arrangement of the invention corresponding to FIG. 3 except that pupil sectioning is performed utilizing a DMD mirror.
Figure 7A:
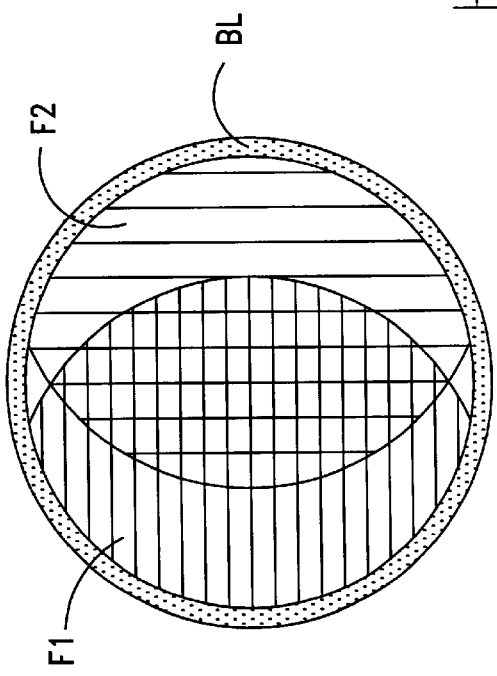
FIG. 7a shows the light relationships in the plane of the aperture diaphragm wherein a variable circular diaphragm is closed by a small amount.

FIG. 7a shows the light relationships in the plane of the aperture diaphragm (entry pupil of the objective) wherein the variable circular diaphragm BL is closed by a small amount. In one clock pulse, the area F1 is illuminated by the illuminating beam and in the next clock pulse, the area F2 of the entry pupil is illuminated. The centroids of the respective light beams are so adjustable within the illuminating aperture that the object is illuminated at the angle required for stereo viewing.

FIG. 7b shows the light relationships in the plane of the aperture diaphragm (entry pupil of the objective). In addition, a variable central diaphragm ZB is mounted as an opaque circular diaphragm. By varying the outer diameter of the circular diaphragm ZB, the depth of field and the resolution of the stereoscopic image can be adapted to the object so that a stereoscopic image of highest resolution is viewed because the zero diffraction order is partially suppressed and therefore the resolution capacity is increased.

FIG. 7c shows the light relationships in the plane of the aperture diaphragm (entry pupil of the objective). An additional variable central diaphragm is mounted as an opaque rectangular diaphragm. By varying the width (b) of the rectangular diaphragm, the depth of field and the resolution of the stereoscopic image can be adapted to the object so that a stereoscopic image of the highest resolution can be observed. An exchange of different diaphragms can, for example, take place by means of a turret having central diaphragms of different dimensions.

In addition to its modulation function, the light modulator itself can operate advantageously as a diaphragm. This is done by means of the liquid crystal matrix in that a part of the liquid crystal matrix is switched into both switch positions to be partially non-transmissive (dark diaphragm regions) in order to clear the illumination beam path. For example, a rectangularly or circularly-shaped center part can be used as shown in FIGS. 7b and 7c having magnitudes which can be driven so as to be varied. The realization that the light modulator itself can also be switched as a diaphragm by means of a liquid crystal matrix is shown, for example, in U.S. patent application Ser. No. 08/610,455, filed Mar. 4, 1996, and incorporated herein by reference.

The diaphragm BL utilized in accordance with the invention must not be mounted exactly in the plane of the entry pupil of the objective OB. Deviations are conceivable up to an order of magnitude of approximately 10% of the condenser focal length of the condenser in FIG. 3 from the position of the plane. The diaphragm is advantageously approximately 5% of the condenser focal length away from the position of the light modulator LM.

It is understood that the foregoing description is that of the preferred embodiments of the invention and that various changes and modifications may be made thereto without departing from the spirit and scope of the invention as defined in the appended claims.

What is claimed is:

1. A microscope arrangement for generating a stereoscopic image of an object for viewing by an observer through left and right oculars of a microscope at a frequency greater than a flicker frequency of the human eye, the microscope arrangement comprising:

a single microscope objective for imaging said object and defining an imaging beam path as well as an entry pupil and an exit pupil along a single optical channel;

illuminating optics for illuminating said object by providing an imaging beam coming from said object and passing through said objective and along said imaging beam path;

means for alternately blocking a section of said imaging beam in said imaging beam path on said single optical channel to form two component beams at a clock frequency greater than said flicker frequency of the human eye with said blocking means being disposed at or near said exit pupil or at a position along said imaging beam path which is optically conjugated to said exit pupil, thereby forming a left image and a right image for a stereo pair;

means for transmitting said left and right images to said left and right oculars of said microscope for viewing by said observer;

said left and right oculars being located on said imaging beam path downstream of said imaging objective; said left and right oculars defining ocular beam paths;

said transmitting means comprising a polarizing beam splitter mounted on said imaging beam path downstream of said blocking means; and, said blocking means including means for changing the polarization of the light transmitted to said polarizing beam splitter at said clock frequency so as to cause said left and right images to be transmitted to said left and right oculars with virtually all of the light transmitted to said polarizer beam splitter reaching each of said oculars.

2. The microscope arrangement of claim 1, further comprising a variable diaphragm mounted at one of the following locations: in said exit pupil, near said exit pupil or at a position along said imaging beam path which is optically conjugated to said exit pupil.

3. The microscope arrangement of claim 2, wherein said blocking means is a DMD mirror or an LCD modulator which includes means for performing a diaphragm function which is changeable with respect to at least one of its diaphragm size and diaphragm form.

4. The microscope arrangement of claim 2, said diaphragm being adjustable with respect to its dimensions.

5. The microscope arrangement of claim 4, wherein said diaphragm can be exchanged.

6. The microscope arrangement of claim 4, wherein said diaphragm is configured as one of the following: a circular diaphragm, a rectangular diaphragm or an iris diaphragm.

7. The microscope arrangement of claim 1, wherein said blocking means includes an LCD modulator.

8. A microscope arrangement for generating a stereoscopic image of an object for viewing by an observer through left and right oculars of a microscope at a frequency greater than a flicker frequency of the human eye, the microscope arrangement comprising:

a single microscope objective for imaging said object and defining an imaging beam path as well as an entry pupil and an exit pupil along a single optical channel;

illuminating optics for illuminating said object by providing an imaging beam coming from said object and passing through said objective and along said imaging beam path;

means for alternately blocking a section of said imaging beam in said imaging beam path on said single optical channel to form two component beams at a clock frequency greater than said flicker frequency of the human eye with said blocking means being disposed at or near said exit pupil or at a position along said imaging beam path which is optically conjugated to said exit pupil, thereby forming a left image and a right image for a stereo pair;

means for transmitting said left and right images to said left and right oculars of said microscope for viewing by said observer;

said blocking means including LCD modulator for forming said left image and said right image for said stereo pair and including means for polarizing the light transmitted from said blocking means; and, said left and right oculars being located on said imaging beam path downstream of said imaging objective; said left and right oculars defining ocular beam paths; and, said transmitting means including a polarizing beam splitter mounted on said imaging beam path downstream of said blocking means; and, means for changing the polarization of the light transmitted to said polarizing beam splitter at said clock frequency whereby said left and right images are transmitted to said left and right oculars.

9. A microscope arrangement for generating a stereoscopic image of an object for viewing by an observer at a frequency greater than a flicker frequency of the human eye, the microscope arrangement comprising:

a single microscope objective for imaging said object and defining an imaging beam path as well as an entry pupil and an exit pupil along a single optical channel;

illuminating optics for illuminating said object by providing an imaging beam coming from said object and passing through said objective and along said imaging beam path;

means for alternately blocking a section of said imaging beam in said imaging beam path along said single optical channel to form two component beams at a clock frequency greater than said flicker frequency with said blocking means being disposed at or near said exit pupil or at a position along said imaging beam path which is optically conjugated to said exit pupil, thereby forming the left image and right image for a stereo pair for viewing by said observer with the left and right eyes;

a video camera;

means for transmitting said stereoscopic sectional images to said video camera;

a 3D display device connected to said video camera to facilitate viewing of said left and right images by said observer; and, said transmitting means including a polarizing beam splitter mounted on said imaging beam path downstream of said blocking means; and, means for changing the polarization of the light transmitted to said polarizing beam splitter at said clock frequency whereby said left and right images are transmitted to said video camera.

10. A microscope arrangement for generating a stereoscopic image of an object for viewing by an observer at a frequency greater than a flicker frequency of the human eye, the microscope arrangement comprising:

a single microscope objective for imaging said object and defining an imaging beam path as well as an entry pupil and an exit pupil along a single optical channel;

illuminating optics for illuminating said object by providing an imaging beam coming from said object and passing through said objective and along said imaging beam path;

means for alternately blocking a section of said imaging beam in said imaging beam path along said single optical channel to form two component beams at a clock frequency greater than said flicker frequency with said blocking means being disposed at or near said exit pupil or at a position along said imaging beam path which is optically conjugated to said exit pupil, thereby forming the left image and right image for a stereo pair for viewing by said observer with the left and right eyes;

a video camera;

means for transmitting said stereoscopic sectional images to said video camera;

a 3D display device connected to said video camera to facilitate viewing of said left and right images by said observer;

said blocking means including a variable light modulator for forming said left image and said right image for said stereo pair; and, said transmitting means including a polarizing beam splitter mounted on said imaging beam path downstream of said blocking means; and, means for changing the polarization of the light transmitted to said polarizing beam splitter at said clock frequency whereby said left and right images are transmitted to said video camera.

* * * * *